(12) United States Patent
Eisendrath et al.

(10) Patent No.: US 7,437,457 B1
(45) Date of Patent: Oct. 14, 2008

(54) REGULATING CONCURRENT LOGINS ASSOCIATED WITH A SINGLE ACCOUNT

(75) Inventors: Benjamin Eisendrath, Washington, DC (US); Bradley Spannbauer, Moorpark, CA (US); Stanley O. Smith, Jr., Arlington, VA (US)

(73) Assignee: AOL LLC, a Delaware Limited Liability Company, Dulles, VA (US)

( * ) Notice: Subject to any disclaimer, the term of this patent is extended or adjusted under 35 U.S.C. 154(b) by 840 days.

(21) Appl. No.: 10/656,874

(22) Filed: Sep. 8, 2003

(51) Int. Cl.
*G06F 15/173* (2006.01)
(52) U.S. Cl. .................. 709/225; 709/227; 709/228; 709/229; 709/204; 709/205; 709/206; 709/207
(58) Field of Classification Search ......... 709/204–207, 709/225, 227–229
See application file for complete search history.

(56) References Cited

U.S. PATENT DOCUMENTS

| | | | |
|---|---|---|---|
| 3,375,208 A | 3/1968 | Duddy | |
| 4,425,410 A | 1/1984 | Farrell et al. | |
| 4,965,798 A | 10/1990 | Mostafa et al. | |
| 5,390,297 A * | 2/1995 | Barber et al. | 726/29 |
| 5,497,504 A * | 3/1996 | Acampora et al. | 455/436 |
| 5,518,761 A | 5/1996 | Hatsuda et al. | |
| 5,526,357 A | 6/1996 | Jandrell | |
| 5,563,882 A | 10/1996 | Bruno et al. | |
| 5,577,197 A | 11/1996 | Beck | |
| 5,602,841 A | 2/1997 | Lebizay | |
| 5,606,668 A | 2/1997 | Shwed | |
| 5,619,716 A | 4/1997 | Nonaka et al. | |
| 5,732,071 A | 3/1998 | Saito et al. | |
| 5,745,884 A | 4/1998 | Carnegie et al. | |
| 5,793,763 A | 8/1998 | Mayes et al. | |

(Continued)

FOREIGN PATENT DOCUMENTS

EP 0889668 A2 1/1999

(Continued)

OTHER PUBLICATIONS

Joyce, Erin, "AOL 8.0 (Home Networking 101)". Oct. 15, 2002, pp. 1-4; www.internetnews.com/xSP/article.php/1481501.

(Continued)

*Primary Examiner*—Jeffrey Pwu
*Assistant Examiner*—Brian P Whipple
(74) *Attorney, Agent, or Firm*—Fish & Richardson P.C.

(57) ABSTRACT

Regulating network access includes receiving a request for network access for a user identity and identifying a type of connection that the user identity seeks to leverage if granted the network access requested. The user identity for which the request is submitted is identified. One or more other user identities that are associated with the user identity are identified. The other user identities that are identified as being associated with the user identity and that have network access contemporaneously with the received request are determined. The types of connections used to obtain network access by the other user identities that are identified as being associated with user identity and determined to have network access are determined. A determination is made whether to grant the user identity the network access requested based on the type of connections used by the other user identities that are identified as being associated with the user identity and determined to have network access.

56 Claims, 4 Drawing Sheets

U.S. PATENT DOCUMENTS

| | | | |
|---|---|---|---|
| 5,822,523 | A | 10/1998 | Rothschild et al. |
| 5,870,386 | A | 2/1999 | Perlman et al. |
| 5,877,724 | A | 3/1999 | Davis |
| 5,918,019 | A | 6/1999 | Valencia |
| 6,006,272 | A | 12/1999 | Aravamudan et al. |
| 6,035,404 | A * | 3/2000 | Zhao ............................ 726/6 |
| 6,044,404 | A * | 3/2000 | Holdsworth et al. ........ 709/229 |
| 6,055,236 | A | 4/2000 | Nessett et al. |
| 6,055,575 | A * | 4/2000 | Paulsen et al. ............... 709/229 |
| 6,101,543 | A | 8/2000 | Alden et al. |
| 6,167,120 | A | 12/2000 | Kikinis |
| 6,212,192 | B1 | 4/2001 | Mirashrafi et al. |
| 6,219,706 | B1 | 4/2001 | Fan et al. |
| 6,256,739 | B1 * | 7/2001 | Skopp et al. .................... 726/2 |
| 6,275,825 | B1 * | 8/2001 | Kobayashi et al. ............. 707/9 |
| 6,337,899 | B1 | 1/2002 | Alcendor et al. |
| 6,374,207 | B1 * | 4/2002 | Li et al. ......................... 703/27 |
| 6,381,222 | B1 | 4/2002 | Kikinis |
| 6,421,325 | B1 | 7/2002 | Kikinis |
| 6,434,619 | B1 * | 8/2002 | Lim et al. ................... 709/229 |
| 6,487,605 | B1 | 11/2002 | Leung |
| 6,496,867 | B1 | 12/2002 | Beser et al. |
| 6,501,741 | B1 * | 12/2002 | Mikkonen et al. ........... 370/310 |
| 6,523,068 | B1 | 2/2003 | Beser et al. |
| 6,535,517 | B1 | 3/2003 | Arkko et al. |
| 6,603,762 | B1 | 8/2003 | Kikinis |
| 6,606,659 | B1 | 8/2003 | Hegli et al. |
| 6,606,668 | B1 | 8/2003 | MeLampy et al. |
| 6,615,357 | B1 | 9/2003 | Boden et al. |
| 6,631,416 | B2 | 10/2003 | Bendinelli et al. |
| 6,640,251 | B1 | 10/2003 | Wiget et al. |
| 6,654,373 | B1 | 11/2003 | Maher, III et al. |
| 6,654,792 | B1 | 11/2003 | Verma et al. |
| 6,671,739 | B1 | 12/2003 | Reed |
| 6,693,878 | B1 | 2/2004 | Daruwalla et al. |
| 6,697,864 | B1 | 2/2004 | Demirtjis et al. |
| 6,704,031 | B1 | 3/2004 | Kimball et al. |
| 6,708,219 | B1 | 3/2004 | Borella et al. |
| 6,738,382 | B1 | 5/2004 | West et al. |
| 6,738,814 | B1 | 5/2004 | Cox et al. |
| 6,745,367 | B1 | 6/2004 | Bates et al. |
| 6,757,836 | B1 | 6/2004 | Kumar et al. |
| 6,802,068 | B1 | 10/2004 | Guruprasad |
| 6,832,322 | B1 | 12/2004 | Boden et al. |
| 6,912,581 | B2 * | 6/2005 | Johnson et al. ............. 709/228 |
| 6,990,592 | B2 * | 1/2006 | Richmond et al. ............ 726/15 |
| 7,027,652 | B1 | 4/2006 | I'Anson |
| 7,043,538 | B2 * | 5/2006 | Guedalia et al. ............ 709/220 |
| 7,079,499 | B1 | 7/2006 | Akhtar et al. |
| 7,093,020 | B1 * | 8/2006 | McCarty et al. ............. 709/229 |
| 7,103,666 | B2 * | 9/2006 | Royer et al. ................. 709/227 |
| 7,103,846 | B1 * | 9/2006 | Shafrir et al. ............... 715/751 |
| 7,124,938 | B1 | 10/2006 | Marsh |
| 7,216,294 | B2 | 5/2007 | Gibbs et al. |
| 2001/0000707 | A1 | 5/2001 | Kikinis |
| 2001/0047394 | A1 | 11/2001 | Kloba et al. |
| 2002/0049806 | A1 * | 4/2002 | Gatz et al. .................. 709/203 |
| 2002/0069172 | A1 * | 6/2002 | Omshehe et al. ............. 705/51 |
| 2002/0071423 | A1 | 6/2002 | Mirashrafi et al. |
| 2002/0116471 | A1 | 8/2002 | Shteyn |
| 2002/0169961 | A1 | 11/2002 | Giles et al. |
| 2003/0005455 | A1 | 1/2003 | Bowers |
| 2003/0009495 | A1 | 1/2003 | Adjaoute |
| 2003/0014631 | A1 | 1/2003 | Sprague |
| 2003/0041240 | A1 | 2/2003 | Roskind et al. |
| 2003/0046413 | A1 * | 3/2003 | Sakakura .................... 709/229 |
| 2003/0115345 | A1 | 6/2003 | Chien et al. |
| 2003/0149781 | A1 * | 8/2003 | Yared et al. ................. 709/229 |
| 2003/0195929 | A1 * | 10/2003 | Franke et al. ............... 709/204 |
| 2004/0205137 | A1 * | 10/2004 | Chen et al. .................. 709/206 |
| 2005/0175020 | A1 | 8/2005 | Park et al. |

FOREIGN PATENT DOCUMENTS

| | | |
|---|---|---|
| JP | 11/275083 | 10/1999 |
| JP | 2001-237898 | 8/2001 |
| WO | WO-99-19988 A | 4/1999 |
| WO | WO99/52244 | 10/1999 |
| WO | WO00/11849 | 3/2000 |
| WO | WO00/72532 | 11/2000 |
| WO | WO01/61897 | 8/2001 |

OTHER PUBLICATIONS

Brill, Pamela, Fast & Furious, Mar. 22, 1999, Networking Computing, pp. 1-3.

Business Wire, Feb. 10, 1998, Ramp Network Ships IP Tunneling Kit for WebRamp M3 Family, pp. 1-4.

Fowler, Dennis, VPN's Become a Virtual Reality, Apr./May 1998, pp. 5-8

Borella et al., "Realm Specific IP: Framework." pp. 1-30 (Jul. 2000), available at ftp://ftp.isi.edu/internet-drafts/draft-ietf-nat-rsip-framework-05/txt.

Montenegro et al.; "RSIP Support for End-to-end IPsec." pp. 1-18 (Jul. 2000), available at http://www.jetf.org/internet-drafts/draft-ietf-net-rsip-ipsec-04.txt.

Marmakos et al.; "A Method for Transmitting PPP Over Ethernet (PPPoE)." pp. 1-15 (Feb 1999), available at ftp://ftp.isi.edu/in-notes.rfc2516.txt.

Evans; "Standards Watch: Tunnelling Through the Web," 'Online;' Mar. 1999; http://www.telsyte.com.au/standardswatch/tunnels.htm, pp. 1-6.

Townsley et al.; "Layer 2 Tunneling Protocol 'L2TP'," IETF, 'Online;' http://www.ietf.org/rfc/rfc2661.txt; Aug. 1999, pp. 1-80.

Redback Networks: "PPP over Ethernet;" 'Online;' Mar. 1999; http://www.redback.com/en-US/whitepp/pdf/wp_pppoe_comparison.pdf; pp. 1-8.

Srisuresh et al., RFC 2663—IP Network Address Translator (NAT) Terminology and Considerations, Aug. 1999, Lucent Technologies.

Network Telesystems, NTS Tunnell Builder User's Guide; Mar. 1999, 50 pgs.

Droms; Networking Group; Request for Comments; 1541; Oct. 1993, 30 pgs.

Newswire Association Inc.; Ramp Networks Announces Comprehensive Virtual Private Network Solution; Targets Corporate Branch Offices; Aug. 9, 1999, 2 pgs.

Red Creek; "Ravlin 7100, High Performance Virtual Private Network Device for the Enterprise Gateway and ISP;" reprinted from http://web.archive.org/web/20000303093640/www.redcreek.com/products/7100.html, 6 pgs.

Srisuresh et al., "Traditional IP Network Address Translator (Traditional NAT)," http://www.jetf.org/refc/rfc3022.tx?number=3022.html, Jan. 2001, pp. 1-16.

Holdrege et al., "Protocol Complications with the IP Network Address Translator," http://www.ietf.org/rfc/rfc3027.txt?number=3027, Jan. 2001, pp. 1-20.

Tsirtsis et al., "Network Address Translation—Protocol Translation (NAT-PT)," http://www.ietf.org/rfc/rfc2766.txt?number=2766, Feb. 2000, pp. 1-19.

Srisuresh et al., "IP Network Address Translator (NAT) Terminology and Considerations," http://www.ietf.org/rfc/rfc2633.txt?number=2663, Aug. 1999, pp. 1-29.

Egevang et al., "The IP Network Address Translator (NAT)," http://www.cis.ohio-state.edu/cgi-bin/rfc/rfc1631.html, May 1994, pp. 1-9.

"Network Address Translation Technical Discussion," http://safety.net/nattech.html, Apr. 18, 1996, pp. 1-4.

Hall, "Hide & Seek with Gateways & Translators," http://www.ehsco.com/reading/19970215ncwl.html, Feb. 15, 1997, pp. 1-15.

Patel et al., "DHCP Confriguration of IPSEC Tunnel Mode", IPSEC Working Group, Dec. 1999, 13 pages.

SonicWall Inc., "Configuring DHCP over VPN" Nov. 12, 2002, 11 pages.

* cited by examiner

REGULATING CONCURRENT LOGINS ASSOCIATED WITH A SINGLE ACCOUNT

TECHNICAL FIELD

This document relates to providing access to systems that offer network-based services and more particularly, to providing access to systems based on the type of connection used to log into the login systems.

BACKGROUND

Online service providers offer network-based services to customers. For instance, the online service providers may provide customers with a connection to a network such as, for example, the Internet. Connection types made available by online service providers may include a dial-up connection, a digital subscriber line (DSL) connection, a cable modem connection, a wireless connection, and a private line connection. Using one or more of these types of connections, a customer may log into an online service provider system and gain access to other network-based services provided by or through that online service provider such as, for example, e-mail and instant messaging.

SUMMARY

In one general aspect, regulating network access includes receiving a request for network access for a user identity and identifying a type of connection that the user identity seeks to leverage if granted the network access requested. The user identity for which the request is submitted is identified. One or more other user identities that are associated with the user identity are identified. The other user identities that are identified as being associated with the user identity and that have network access contemporaneously with the received request are determined. The types of connections used to obtain network access by the other user identities that are identified as being associated with user identity and determined to have network access are determined. A determination is made whether to grant the user identity the network access requested based on the type of connections used by the other user identities that are identified as being associated with the user identity and determined to have network access.

Implementations may include one or more of the following features. For example, the user identity may be a screen name or an Internet Protocol address and the network access may be Internet access. The user identity may be an e-mail address or a media access control address. The type of connection used by the other user identities may include one of wireless, dial-up, digital subscriber line, and cable modem. The type of connections used by other user identities may include one of wireless, dial-up, digital subscriber line, and cable modem. The user identity may include an Internet Protocol address and identifying a type of connection may include identifying the type of connection based on the Internet Protocol address. The user identity may include a network identity and identifying a type of connection may include identifying a type of connection based on the network identity. The other user identities associated with the user identity may be other user identities that are associated with the same online service account as the user identity.

Determining whether to grant access may include applying a set of login rules to determine whether to grant access. Applying the login rules may result in denying access if a maximum number of concurrent logins has been reached. The concurrent logins may include concurrent logins using the same type of connection as the type of connection used by the user identity to attempt to access the online service provider system. The login rules may limit the number of concurrent logins to a maximum number of concurrent logins for a predetermined amount of time. The login rules may vary based on user identity and/or based on the existence of one or more identified conditions. The login rules may limit the number of concurrent logins based on temporal constraints. The login rules may limit the number of concurrent logins for one or more predetermined time intervals.

Determining whether to grant the user identity access may include denying access and may further include sending an access denied message to be perceived by a user associated with the user identity. The access denied message may be configured to be perceived by the user as a graphical display, may include information related to the reason why the access was denied, data related to the other user identities such as the types of connections used by the other user identities, and options configured to be selectable by the user.

An option selection may be received from the user and limited network access may be granted to the user identity associated with the user in response to the received option selection. The limited network access may be network access for a limited duration of time or may be network access that is limited to exchanging communications with the other user identities.

An option selection may be received from the user and network access may be denied to one of the other user identities associated with the user identity in response to the received option selection. The other user identity that is denied access may have had access to the network contemporaneously with the received option selection. Network access may be granted to the user identity after denying network access to the other user identity.

An option selection may be received from the user and the user may be allowed to register for a network access service upgrade in response to the received option selection.

In another general aspect, a computer system for regulating access to an online service provider system includes a customer account data store, a system state data store, and an authentication server. The authentication server receives a request for network access for a user identity and identifies a type of connection that the user identity seeks to leverage if granted the network access requested. The authentication server accesses the customer account data store to identify one or more other user identities associated with the user identity. The authentication server accesses the system state data store to determine whether the other user identities have network access contemporaneously with the received request and to determine the types of connections used to obtain the network access by the other user identities. The authentication server determines whether to grant the user identity the network access requested based on the types of connections used by the other user identities that are identified as being associated with the user identity and determined to have network access.

Implementations may include one or more of the following features. For example, the customer account data store and the system state data store may be a single integrated data store.

The details of one or more implementations are set forth in the accompanying drawings and the description below. Other features will be apparent from the description and drawings, and from the claims.

DETAILED DESCRIPTION

Figure 1:
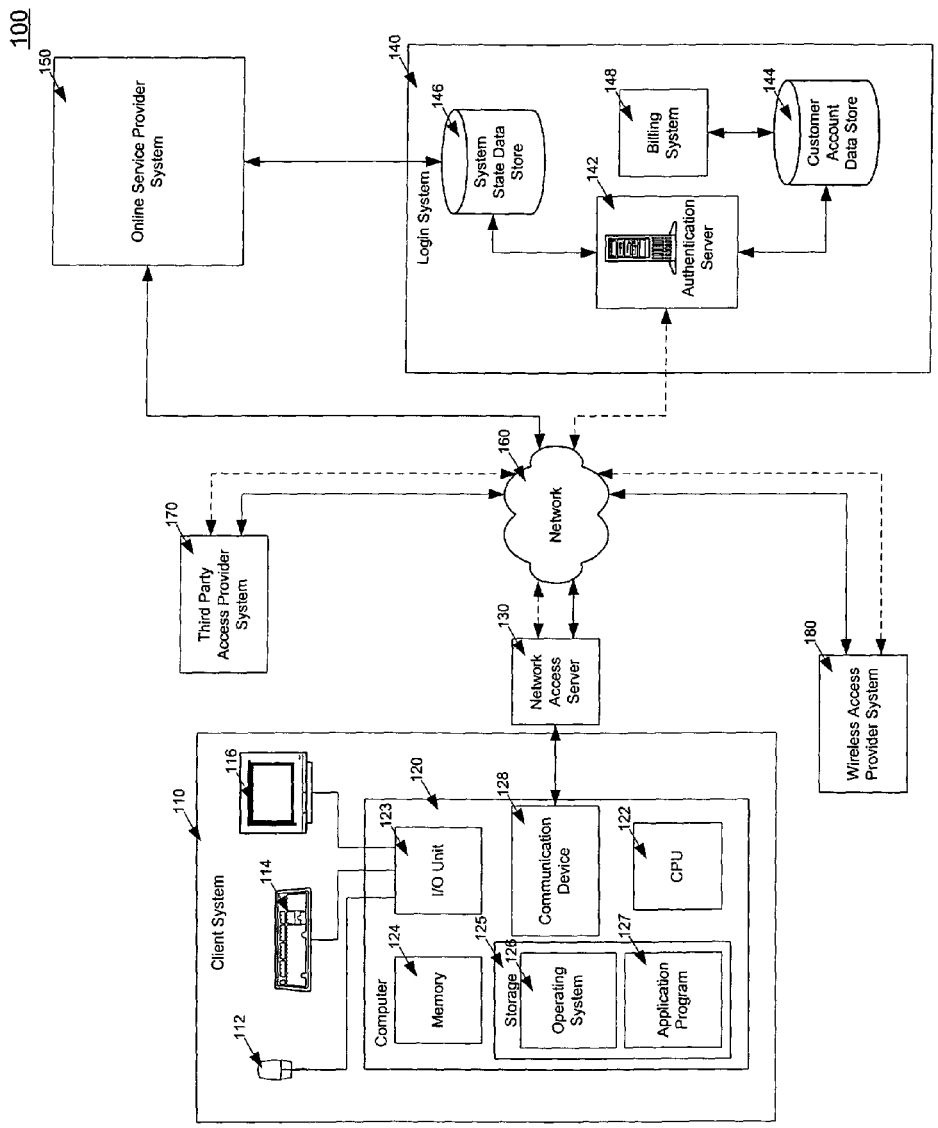
FIG. 1 is a block diagram of a communications system for regulating concurrent logins associated with a single account.

A login system regulates concurrent logins to an online service provider system by user identities associated with a single online service account. The login system may limit the number of concurrent logins associated with a single online service account based on the type of connection used to access the login system. For example, the login system may limit the number of concurrent logins using a dial-up connection to five and the number of concurrent logins using a broadband connection to one.

The login system may include an authentication server that receives a user identity of a user attempting to log into the online service provider system and that receives or determines the type of connection used by that user identity to access the online service provider system. Connection types made available by an online service provider may include a dial-up connection, a wireless connection, a private line connection, and a broadband connection such as a digital subscriber line (DSL) connection or a cable modem connection. The authentication server retrieves, from a customer account data store, other user identities associated with the same online service account as the received user identity, and it accesses a system state data store to retrieve state data that includes the current login status of the other user identities and the types of connections used by the other user identities to log into the online service provider system. The authentication server thereafter accesses login rules associated with the online service account, and it applies those login rules to the retrieved state data to determine whether the received user identity is permitted to log in.

The login rules may impose a limit, by connection type, on the number of user identities associated with the online service account that are permitted to be concurrently logged into the online service provider system. Limiting the number of concurrent logins associated with the online service account may serve to decrease the extra costs incurred by the online service provider in servicing the account. The extra costs vary based on the type of connection used to access the online service provider system and may include, for example, network bandwidth costs and modem costs. Alternatively, rather than limit, the login rules may track by connection type the number of user identities associated with the online service account that are concurrently logged in. Among other things, tracking the concurrent logins by connection type may enable the online service provider system to bill the customer associated with the online service account in accordance with the extra costs incurred in servicing the multiple concurrent logins.

An online service account for the purposes of this document is a single online service package that enables multiple associated users or user identities to receive online services as a group and to commonly pay for or be billed for the services as a group. Accordingly, multiple users or user identities may be concurrently receiving services or otherwise accessing the network at any given time.

Referring to FIG. 1, a communications system 100 for regulating concurrent logins associated with a single account includes a client system 110 that communicates with a login system 140 and with an online service provider system 150 over a network 160. Communications sent to and received by the client system 110 pass through a network access server 130 which enables the client system 110 to access the network 160. The network access server 130 also communicates with the login system 140 to grant or deny the client system 110 access to the online service provider system 150. The login system 140 includes an authentication server 142, a customer account data store 144, and a system state data store 146. The network access server 130, the login system 140, and the online service provider system 150 are affiliated with the same online service provider (i.e., the same online service provider incurs the costs of running the network access server 130, the login system 140, and the online service provider system 150). A third party access provider system 170 (i.e., a system that provides access services and is operated by a service provider unaffiliated with the online service provider) and a wireless access provider system 180 also communicate with the login system 140 and with the online service provider system 150.

The client system 110 is configured to enable a user to access services from the online service provider system 150 by sending a user identity and authentication information to the authentication server 142 through the network access server 130. The user identity may be, for example, a screen name provided by the user, a network identity associated with, for example, the third party access provider system 170 or the wireless access provider system 180, an Internet Protocol (IP) address corresponding to the client system 110, an e-mail address, a media access control (MAC) address, or an identity unique for a specified client system 110 (e.g., a serial number of the client system 110 or a device included in the client system 110). The authentication information may be, for example, a password. The hardware setup of the client system 110 may include various input/output (I/O) devices (e.g., mouse 112, keyboard 114, and display 116) and a general purpose computer 120 having a central processor unit (CPU) 122, an I/O unit 123, a memory 124, and a storage 125 that stores data and various programs such as an operating system 126 and one or more application programs 127. The client system 110 also includes a communication device 128 for exchanging data with the network access server 130. The communication device 128 may be, for example, a dial-up modem that enables a narrowband connection with the network access server 130, or a digital subscriber line (DSL) or a cable modem that enables a broadband connection with the network access server 130. Other examples of client system 110 include a workstation, a server, a device, a component, or other equipment of some combination thereof capable of responding to and executing instructions in a defined manner.

The network access server 130 is a computer system configured to aggregate calls or communications received from communication devices 128 of multiple client systems 110 for delivery over network 160. The network access server 130 may include modem banks to handle dial-up calls and/or to handle broadband communications (e.g., DSL calls and/or cable modem communications).

The network access server 130 is also configured to request authentication of client systems 110 from the authentication server 142 to enable the client systems 110 to access the online service provider system 150. The network access server 130 receives an identity and authentication information from the client system 110 and identifies the type of connection used by the client system 110 to communicate with the network access server 130.

The network access server 130 sends an access request to the authentication server 142. The access request includes the user identity, the authentication information, and the type of connection. The authentication server 142 processes the request and sends an access response that either denies or grants the client system 110 access to the online service provider system 150. If the access response grants access to the client system 110, the network access server 130 enables the communication device 128 to communicate with the online service provider system 150 by, for example, packetizing any communications received from the communication device 128 and relaying the packetized information to the online service provider system 150 over network 160. FIG. 1 shows the access communications between the authentication server 142 and the network access server 130 represented by dashed arrows, and the subsequent communications between the client system 110 and the online service provider system 150 (assuming the client system 110 is granted access) represented by solid arrows.

In another implementation, the network access server 130 is not configured to identify the type of connection used by the client system 110 to communicate with the network access server 130. Instead, the network access server 130 sends some identifiable indicia related to the type of connection to the authentication server 142 which uses the identifiable indicia to determine the type of connection. For example, the authentication server 142 may determine the type of connection based on the IP address of the client system 110, based on the connection speed between the client system 110 and the network access server 130, or based on a network identity associated with, for example, the third party access provider system 170 or the wireless access provider system 180.

In one implementation, the network access server 130 is an Ascend® terminal server configured to communicate with the authentication server 142 using a communications protocol such as, for example, Remote Authentication Dial-in User Service (RADIUS). In another implementation, the network access server is a Redback® aggregation platform.

The login system 140 is a computer system configured to control user access to the online service provider system 150. In another implementation, the login system 140 and the online service provider system 150 are a single integrated system.

The authentication server 142 is configured to authorize access to the online service provider system 150 by a user corresponding to a user identity associated with an account. Multiple user identities may be associated with a single account, each of which may independently access the online service provider system 150 through the third party access provider system 170, the wireless access provider system 180, or through the network access server 130. Thus, at any given time, more than one identity may be concurrently logged into the online service provider system 150.

The authentication server 142 is configured to receive a user identity and authentication information from the network access server 130, the third party access provider system 170, or the wireless access provider system 180. The authentication server 142 determines the type of connection by either receiving information about the type of connection from the network access server 130, the third party access provider system 170, or the wireless access provider system 180 or by determining the type of connection based on other communication-related information such as, for example, the IP address of the client system 110 (i.e., IP address ranges can correspond to different types of connections), the IP addresses assigned to different access providers, and the connection speed.

The authentication server 142 accesses account data from the customer account data store 144 based on the received user identities. The account data includes all of the user identities associated with the same account, corresponding authentication information (e.g., passwords) for each user identity, and login rules for the account. The authentication server 142 also accesses state data from the system state data store 146 and applies the login rules using the state data to determine whether the requested login is concurrently permitted. The state data includes user identities that are currently logged in and the type of connection currently being used by those user identities to log into the online service provider system 150. If another concurrent login is not permitted, the authentication server 142 sends an access denied response to the network access server 130, the third party access provider system 170, or the wireless access provider system 180 indicating that another concurrent login is not permitted.

If another concurrent login is permitted, the authentication server 142 determines whether to enable the user to login by, for example, comparing the received authentication information to the corresponding authentication information retrieved from the customer account data store 144 for the user identity that is attempting to log in. If the authentication information matches or otherwise indicates that the login is authentic, the authentication server 142 sends an access response to the network access server 130, the third party access provider system 170, or the wireless access provider system 180 that permits access to the online service provider system 150 by the user identity that is attempting to log in. In some implementations, the authentication server 142 updates the system state data store 146 to record that the user identity was permitted to login and to record the login connection type. If, however, the authentication information does not match or otherwise does not indicate that the login is authentic, the authentication server 142 sends an access denied response indicating that the authentication information did not match or the login was not determined to be authentic.

The login rules are rules that limit the number of concurrent logins to the online service provider system 150 by user identities associated with a single account. Limiting the number of concurrent logins associated with a single account may decrease the costs incurred by the online service provider in servicing the account. The service costs include, for example, modem costs (e.g., up-up and DSL modem costs) and network bandwidth costs. Limiting the number of concurrent logins decreases the modem costs by limiting the number of modems needed to service the account and decreases the network bandwidth costs by limiting the amount of bandwidth on the network used to handle traffic associated with the account.

The network bandwidth costs incurred by the online service provider in servicing an account vary by the type of connection used to access the online service provider system 150. For example, the network bandwidth costs to provide services to a user with a narrowband connection may be less than the network bandwidth costs to provide services to a user with a broadband connection because the maximum traffic that may be generated by a user with a broadband connection at any given time is significantly higher than the maximum traffic that may be generated by a user with a narrowband connection.

The modem costs incurred by the online service provider in servicing an account also vary by the type of connection used to access the online service provider system 150. For example, the online service provider incurs modem costs when a user of client system 110 accesses the online service provider system 150 through the network access server 130 using, for example, a dial-up or a DSL connection. The online service provider, however, does not incur any modem costs when a user accesses the online service provider system 150 using a connection through the third party access provider system 170.

Accordingly, the login rules may limit the number of concurrent logins based on connection type, with one potential consequence being that the online service provider is made better able to manage the costs of providing services to an account. In some implementations, the login rules impose a maximum number of concurrent logins for a given connection type. For example, in aggregate from user identities associated with a single account, the login rules may concurrently allow a maximum of one wireless connection, one broadband connection, two narrowband connections, and four third party access provider connections. Thus, if two users corresponding to two user identities associated with the account are logged into the online service provider system 150 using narrowband connections, a third user corresponding to a third identity associated with the account that attempts to log into the online service provider system 150 using a narrowband connection is denied access by the authentication server 142.

The login rules may limit the maximum number of concurrent logins during one or more identified time intervals regardless of connection type or taking into account connection type. For example, the login rules may concurrently allow a maximum of one wireless connection, one broadband connection, two narrowband connections, and four third party access provider connections, but may limit the total number of concurrent logins between the peak usage hours of 8 AM-5 PM to four (4), regardless of the connection type associated with those four logins.

The login rules also may limit the number of concurrent logins while one or more identified conditions are determined to exist. For example, the login rules may concurrently allow a maximum of five wireless connections only during a limited time trial membership offered to and accepted by a user or based on online-related behavior of the user that may or may not be related to access time.

The login rules also may be time-dependent and may only allow a certain number of concurrent logins for a certain amount of time. For example, the login rules may only allow a maximum of four concurrent logins for a six hour duration and, after expiration of six hours, the authentication server 142 forces one of the user identities to logout. The authentication server 142 may record the login time of the fourth concurrent login and, after expiration of six hours, may send an access denied message to either the third party access provider system 170, the network access server 130, or the wireless access provider system 180 to log out one of the user identities. The user identity that is forced to log out may be, for example, the last one to log into the online service provider system 150 or, alternatively, the first one to log into the online service provider system 150. In another implementation, the user identity that is forced to log out is the user identity that has been assigned the lowest rank in the account set up. Similarly, the login rules also may limit the concurrent login time based on connection type. For example, the login rules may only allow two narrowband connections to be concurrently logged into the online service provider system 150 for a maximum of two hours at any one time.

The authentication server 142 also may limit the aggregate concurrent login time over multiple different login sessions over the course of a longer period of time such as a week or a month. For example, the login rules may allow a maximum two narrowband connections to be concurrently logged into the online service provider system for a total of eight hours in a given month.

The login rules also may vary based on user identity. For example, the Trenner family account may have three user identities associated with it: "JoeTrenner2" used by the father Joe Trenner, "JillTrenner5" used by the mother Jill Trenner, and "GraceTrenner3" used by the teenage daughter Grace Trenner. Joe Trenner uses a wireless pager to access services from the online service provider system 150 for important purposes related to his work. Accordingly, the login rules corresponding to the Trenner family account ensure that the user identity "JoeTrenner2" is always able to log into the online service provider system 150 using a wireless connection, regardless of any other concurrent logins. If the user identities "JillTrenner5" and "GraceTrenner3" are both logged in when Joe Trenner attempts to login using the identity "JoeTrenner2" and the Trenner family account is set up to only allow a maximum of two concurrent logins, either "JillTrenner5" or "GraceTrenner3" are forced to logoff to enable "JoeTrenner2" to log in using a wireless connection. If Joe Trenner had attempted to log in using the identity "JoeTrenner2" using a narrowband connection rather than using a wireless connection, he would not have been able to log into the online service provider system 150 because his login would result in three concurrent logins which violate the login rules set up for the Trenner family account.

Login rules, therefore, direct the authentication server 142 to limit the number of concurrent logins. If a login of a user identity is restricted by the login rules due to the maximum number of concurrent logins being reached, the authentication server 142 may, nevertheless, enable the login by employing a conflict resolution algorithm to log off one of the other user identities currently logged into the online service provider system 150. The conflict resolution algorithm may be rank-based such that each user identity has a rank and lower ranked user identities that are logged in are logged off to make room for higher ranked user identities to log in. In another implementation, the authentication server 142 sends a notification message to one or more of the user identities that enables them to select the user identities that will be forced to log off.

In yet another implementation, the login rules do not direct the authentication server 142 to limit the number of concurrent logins but rather direct the authentication server 142 to track the number and duration of concurrent logins by connection type. The authentication server 142 may access and update a concurrent login history data record associated with each customer account in the customer account data store 144 to keep track of the occurrence of concurrent logins for each customer account. Periodically, a billing system (not shown) may access the concurrent login history data records for each customer account and bill the customer in accordance with the additional service costs, such as network bandwidth costs and modem costs, associated with the concurrent logins.

The customer account data store 144 is a data storage device configured to store account information for accounts registered to receive services from the online service provider system 150. The account information includes the user identities associated with a given account, authentication information and relative rank, if applicable, for each user identity, and the login rules for the account. The configuration data store 334 may store this information in data records that may be indexed, for example, by user identity and/or by account name. In some implementations, this information is stored in multiple different data stores accessible to the authentication server 142. An example of a data record for the Trenner family account is shown in Table 1.

TABLE 1

| Account | User Identity | Password | Rank | Login Rules |
|---|---|---|---|---|
| Trenner | JoeTrenner2 | 5291 | 1 | Connectionpriority(JoeTrenner2, wireless) |
| | JillTrenner5 | 73ab | 2 | Maxlogins(2) |
| | GraceTrenner3 | Fab5 | 3 | |

The system state data store 146 is a data storage device configured to keep track of login state information for the online service provider system 150. The login state information includes the user identities that are currently logged in which may be represented by an indication of login state for a more exhaustive list of user identities, the time of login for each user identity, and the type of connection used to log into the online service provider system 150. The login state information also may include a session identification (ID) to keep track of individual login sessions and the logout time for each session ID. The login state information may be indexed in a variety of different ways including by user identity, by connection type, and by session ID. The authentication server 142 accesses the records for all user identities associated with an account to determine which user identities are simultaneously logged in and what types of connections are currently being used by those user identities to log into the online service provider system 150.

TABLE 2

| Session ID | User Identity | Login Time | Logout Time | Connection Type |
|---|---|---|---|---|
| 001203 | JoeTrenner2 | 030813022030 | | wireless |
| 001324 | SornSorendor7 | 030813025050 | 030813045050 | dial-up |
| 001457 | JillTrenner5 | 030813043030 | | dial-up |
| 001476 | X8SSsornSorpentor | 030813048030 | | broadbandDSL |
| 001521 | EQSx2 | 030813055050 | | Third party |

In some implementations, the customer account data store 144 and the system state data store 146 are a single data store or table.

The online service provider system 150 is a computer system configured to provide network-based services. The network-based services may include, for example, online data communications services such as e-mail services, instant messaging services, Internet access, and/or access to online content. The online service provider system 150 is configured to provide network-based services only to those user identities that have received authorization from the authentication server 142.

The network 160 is configured to enable direct or indirect communications between the network access server 130, the login system 140, the online service provider system 150, the third party access provider system 170, and the wireless access provider system 180. Examples of the network 160 include the Internet, Wide Area Networks (WANs), Local Area Networks (LANs), analog or digital wired and wireless telephone networks (e.g., Public Switched Telephone Network (PSTN)), radio, television, cable, satellite, and/or any other delivery or tunneling mechanism for carrying data.

The third party access provider system 170 is a computer system operated by a third party unaffiliated with the online service provider that is configured to enable users to access the online service provider system 150. The access costs, including costs associated with dial-up and DSL modems and costs associated with terminating cable communications, are incurred by the third party and not by the online service provider. The third party access provider system 170 is configured to enable users to request user access to the online service provider system 150 in a manner similar to that used by the network access server 130 (i.e., by sending an access request to the authentication server 142 and receiving an access response that grants or denies access).

The wireless access provider system 180 is a computer system configured to enable users of wireless devices (e.g., mobile phones, pagers, and personal digital assistants (PDAs)) to access the online service provider system 150. The wireless access provider system 180 may employ various wireless access technologies including, but not limited to, code division multiple access (CDMA), global system for mobile communications (GSM), general packet radio service (GPRS), 802.11a, 802.11b, 802.11g, and satellite or successors to these technologies.

The wireless access provider system 180 is configured to enable users to request user access to the online service provider system 150 in a manner similar to that used by the network access server 130. The authentication information and the user identifier for a wireless device, however, may not need to be specified by the user but rather may be identified for the device and sent automatically to the authentication server 142 by the wireless access provider system 180 when the wireless device is first turned on or switched to network communications mode by the user. This self-authentication feature is typical of wireless devices but also may be found in some wired devices. The connection of a wireless device with the online service provider system 150 is distinct and is typically managed differently than that of other access devices. For example, the connection typically experiences more drops or delays and may have a different data profile (e.g., the data sent is typically text data). Accordingly, the login rules may place different restrictions on concurrent logins over a wireless connection than the restrictions placed on concurrent logins using other types of connections. The login rules may, for example, allow more concurrent wireless logins due to the lower network costs associated with sending only text data and due to the transient nature of wireless connections.

Figure 2:
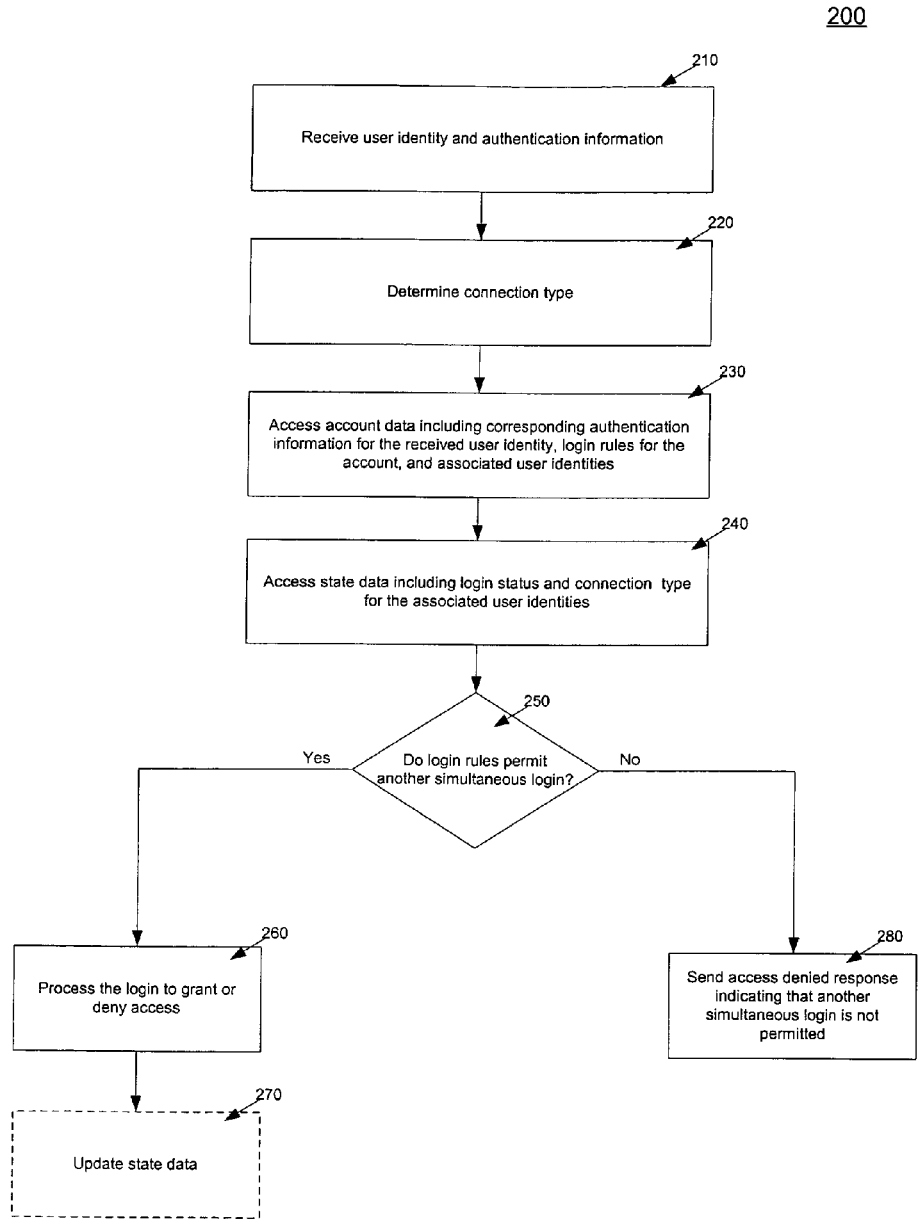
FIG. 2 is a flow chart of a process for regulating multiple concurrent logins associated with a single account.

FIG. 2 shows a process 200 performed by the authentication server 142 to regulate multiple concurrent logins associated with a single account. For convenience, particular components described with respect to FIG. 1 are referenced when describing the process 200. However, similar methodologies may be applied in other implementations where different components are used to define the structure of the system, or where the functionality is distributed differently among the components shown by FIG. 1.

Typically, responsive to a login request by a user identity, the authentication server 142 receives the user identity of the requester and its associated authentication information from the network access server 130, the third party access provider system 170, or the wireless access provider system 180 (210). In some implementations, the authentication server 142 also receives the connection type used by the client system 110 to access the network access server 130, the third party access provider system 170, or the wireless access provider system 180.

The authentication server 142 determines the connection type (220), based on an identification made and received from authentication server 142 (e.g., with the user identity) or based on its own analysis from other communication-related information provided with the user identity such as indicia of connection type, as discussed previously.

The authentication server 142 accesses account data from the customer account data store 144 (230). The account data includes the other user identities associated with the account, the authentication information for the received user identity, and the login rules for the account. The authentication server 142 also accesses state data from the system state data store 146 (240). The state data includes the login status and the connection type corresponding to each of the other user identities associated with the account, or at least the login status and corresponding connection type for user identities that are logged in at the time of the request.

The authentication server 142 applies the login rules to the state data to determine whether another concurrent login is permitted (250). As discussed previously, the login rules that are applied may place a limit on the number of concurrent logins associated with the account based on connection type and/or may place a limit on the number of concurrent logins associated with the account regardless of connection type. The login rules may be generally applicable to all user identities associated with the account and, additionally or alternatively, may include rules that are individualized to specific user identities. The login rules also may be time-dependent and may only allow a certain number of concurrent logins for a certain duration of time, or may apply restrictions at specific time intervals/periods (e.g., peak hours each day, which may vary for specific days of week or year).

If the login rules permit another concurrent login, the authentication server 142 processes the login to grant or deny the received user identity access to the online service provider system 150 (260). Processing the login includes authenticating the login. As discussed previously, the authentication server 142 either sends an access granted response or an access denied response to the network access server 130, the third party access provider system 170, or the wireless access provider system 180, depending on whether the login is determined to be authentic. In some implementations, if the authentication server 142 grants the user identity access to the online service provider system 150, the authentication server 142 also updates the login status of the user identity in the system state data store 146 (270).

If the login rules do not permit another concurrent login, the authentication server 142 sends an access denied response to the network access server 130, the third party access provider system 170, or the wireless access provider system 180 (280). The access denied response indicates that the received user identity is denied access because the account configuration does not permit another concurrent login.

The access denied response may contain information related to the login status of the user identities associated with the account and information related to the current restrictions on the account as set forth in the login rules for that account. This information may be relayed by the network access server 130, the third party access provider system 170, or the wireless access provider system 180 to the access device (e.g., desktop computer, portable digital assistant, and cell phone) that is attempting to login. The access device may enable a user to perceive some or all of this information to provide the user with an indication as to why the login was denied. Furthermore, the access device may provide a user with a set of options which may be selected by the user to overcome the login restriction.

Figure 4:
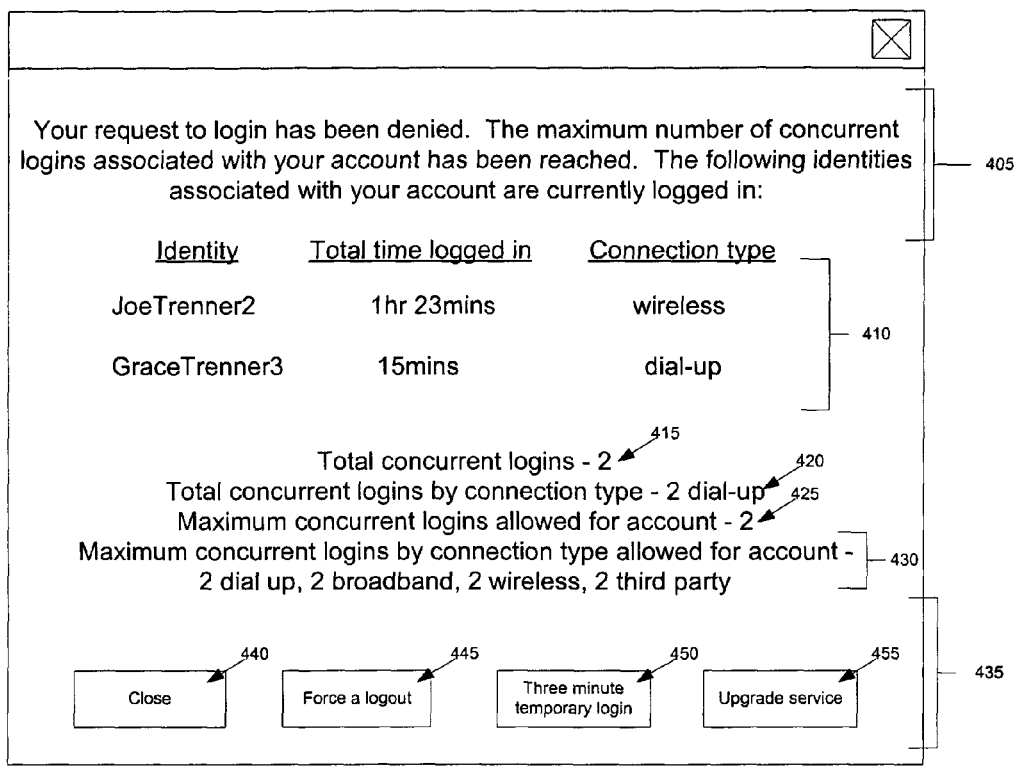
FIG. 4 is a user interface presented to a user when a login request is denied.

FIG. 4 shows a user interface 400 that may be presented to the user by the access device upon receipt of an access denied response. The user interface 400 includes a few statements 405 informing the user that the login request has been denied and providing an explanation for why the login request has been denied. For example, the explanation may state that the maximum number of concurrent logins associated with the account has been reached. The user interface 400 includes a table 410 listing the other user identities associated with the account that are currently logged in. The table 410 also lists the login connection type and the total time logged in for each user identity that is currently logged in. In the example shown, the user identity "JoeTrenner2" and the user identity "GraceTrenner3" are currently logged in. "JoeTrenner2" has been logged in for one hour and 23 minutes using a wireless connection, and "GraceTrenner3" has been logged in for 15 minutes using a dial-up connection. In another implementation, the table 410 only displays user identities that are currently logged in and that have been assigned a lower relative rank than the user of the access device.

The user interface 400 also may provide a tally 415 of the number of logins in aggregate that are concurrently logged in and a tally 420 of the number of concurrent logins by connection type. In the example shown, the total number of concurrent logins is two, and the total number of concurrent logins by connection type is one dial-up and one wireless. The user interface 400 also may indicate the total number of concurrent logins in aggregate 425 and by connection type 430 allowed for the account based on the login rules associated with the account. By comparing the tallies 415 and 420 with the numbers 425 and 430, a user of the access device may determine the reason for the denial of the login request. In the example shown, the total concurrent logins is two and the maximum concurrent logins allowed for the account also is two. Accordingly, the login request was denied because the maximum number of concurrent logins associated with the account has been reached. As discussed previously, the statements 405 also provide this information.

The user interface 400 also includes a set of option buttons 435. The set of option buttons 435 may include a close button 440, a force logout button 445, a temporary login button 450 (e.g., three minute login), and an upgrade service button 455. The user of the access device may select the close button 440 to close or otherwise deactivate the user interface 400.

The user of the access device may select the force logout button 445 to force a user identity from the table 410 or from a subset of the list of user identities in the table 410 to logout and thereby enable the user of the access device to login. In one implementation, selecting the force logout button 445 results in a list containing the user identities listed in table 410 to be displayed in a pop-up window. The user may then select one of the user identities in the list and force the logout at that time. In another implementation, the force logout button 445 enables the user to force only those user identities that have a lower rank to logout.

The user of the access device may select the temporary login button 450 to be allowed to login for a three minute time interval. The three minute temporary time interval allows the user to login and to request that one of the other users associated with the account should log off. The ability to request a temporary login is limited so as to prevent abuse (e.g., the user may only request a temporary login twice per hour and the login may be limited to messaging the other user). The duration of the temporary login need not be three minutes but rather may be any time interval, which may be reflective of the context within which login/access is requested and which may itself be selectable as inducing membership or as revenue-bearing (see 445).

The user of the access device may select the upgrade service button 455. The upgrade service button 455 enables the user of the access device to register for an upgraded service that allows modification to the number of allowable concurrent logins, or temporary access parameters. Upon registering for the upgraded service, the user may once again attempt to login.

The user interface 400 is an exemplary graphical interface of an access device. In another implementation, the access device may include a user interface that provides more or less information to the user than that displayed in the user interface 400. For example, the user interface may explicitly display all of the login rules for the account. The user interface may not display the total time logged in or the login connection type. The user interface also may have more or less options than those in the list of options 435.

In another implementation, the authentication server 142 may not send an access denied response indicating that another concurrent login is not permitted despite the login rules not permitting another concurrent login. Rather, the authentication server 142 may force one of the associated user identities to log-off to make room for the received user identity. As discussed previously, the authentication server 142 may use a conflict-resolution algorithm to determine which associated user identity may be forced to log off. For example, the authentication server 142 may force a lower ranking user identity to log off to allow a higher ranking user identity to log on.

In yet another implementation, the authentication server 142 processes all logins to grant or deny access to the online service provider system 150, regardless of how many associated user identities are currently logged into the online service provider system 150. In this implementation, the authentication server 142 tracks the number and duration of concurrent logins by connection type. The authentication server 142 accesses and updates a concurrent login history data record accordingly as discussed previously. A billing system 148 accesses the concurrent login history data record and thereby passes the additional costs arising from concurrent logins to the customer.

Figure 3:
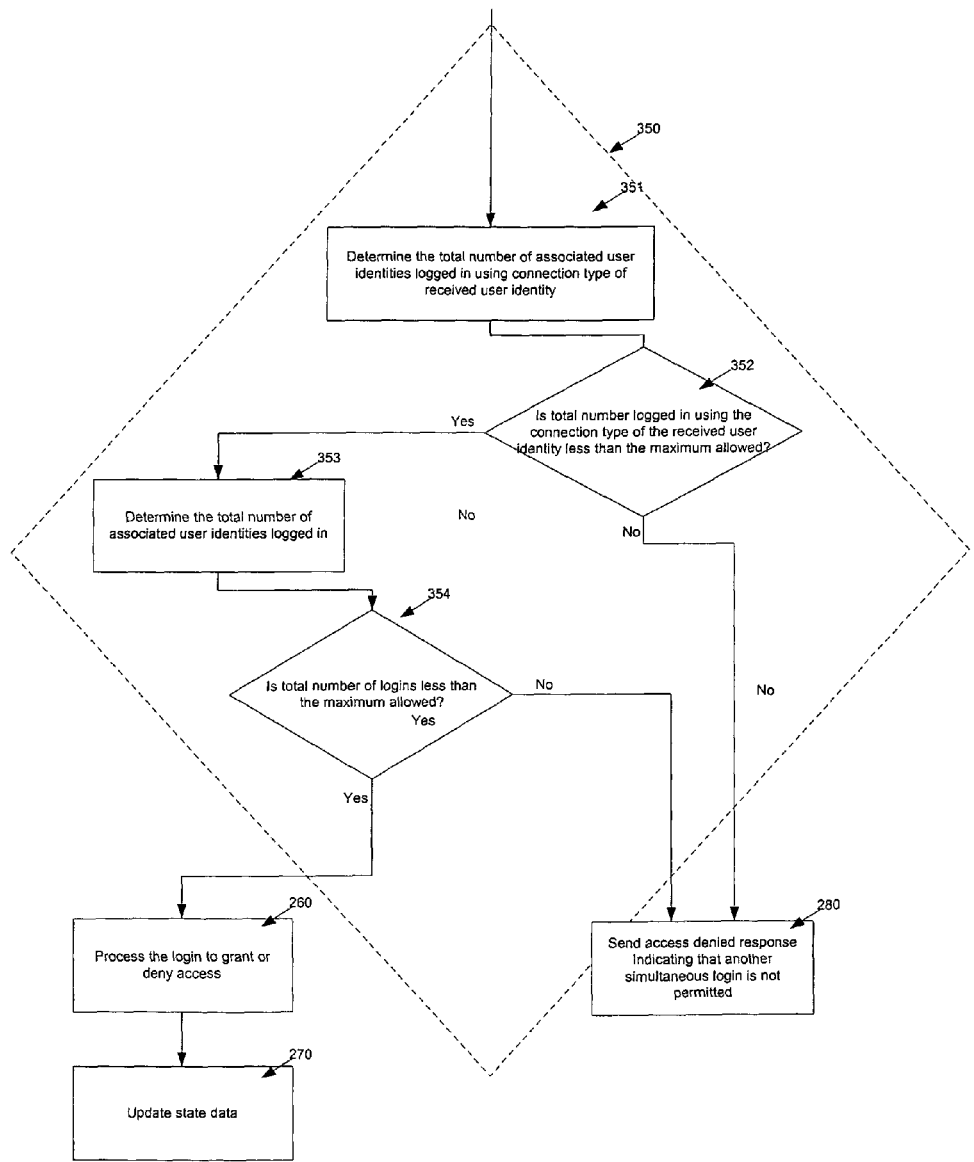
FIG. 3 is a flow chart of a process for applying an exemplary set of login rules to determine whether another concurrent login is permitted.

FIG. 3 shows a process 350 performed by the authentication server 142 for applying an exemplary set of login rules to determine whether another concurrent login is permitted (i.e., process 350 is an implementation example of operation 250). The set of login rules in this particular example place a limit on the number of concurrent logins by connection type and on the total number of concurrent logins for all connection types.

After the authentication server 142 performs operations 210-240, the authentication server 142 processes the accessed state data to determine the total number of associated user identities logged in using the same type of connection as that used by the received user identity (351). For example, if the received user identity, "JoeKeast3", is associated with the Keast family account and is attempting to access the online service provider system 150 using a broadband connection through the network access server 130, the authentication server 142 processes the state data related to the Keast family account to determine that the number of other associated user identities that are currently logged into the online service provider system 150 using a broadband connection is two.

The authentication server 142 determines whether the total number of associated user identities currently logged into the online service provider system 150 using the connection type of the received user identity is less than the maximum allowed (352). If the total number of associated user identities currently logged into the online service provider system 150 using the connection type of the received user identity is less than the maximum allowed, the authentication server 142 determines the total number of associated user identities currently logged into the online service provider system 150 regardless of connection type (353). For example, the login rules for the Keast family account indicate that a maximum of three user identities may be simultaneously logged into the online service provider system 150 using a broadband connection. Accordingly, since the two concurrent logins using broadband connections are less than the permitted three concurrent logins, the authentication server 142 processes the state data related to the Keast family account to determine that the total number of associated user identities that are currently logged into the online service provider system 150 is five.

The authentication server 142 determines whether the total number of associated user identities logged into the online service provider system 150 is less than the maximum number of concurrent logins allowed for the account (354). If the total number of associated user identities logged into the online service provider system 150 is less than the maximum number of concurrent logins allowed for the account, the authentication server 142 processes the login to grant or deny access as discussed before (260) and updates the state data if necessary (270). The comparisons performed in operations 352 and 354 may vary based on temporal constraints (time of day/week/month/year) and on aggregate consecutive usage (e.g., a maximum of ten hours of concurrent usage for a month for dial-up connections) as discussed previously.

If the total number of associated users logged into the online service provider system 150 using the connection type of the received user identity is not less than the maximum allowed or if the total number of associated user identities logged into the online service provider system 150 regardless of the connection type is not less than the maximum allowed, the authentication server 142 sends an access denied response indicating that another concurrent login is not permitted (280). For example, the login rules for the Keast family account indicate that a maximum of five user identities may be simultaneously logged into the online service provider system 150. Accordingly, since five associated user identities are currently logged into the online service provider system 150, the authentication server 142 sends an access denied response to the network access server 130 indicating that the user identity JoeKeast3 may not login because another concurrent login is not permitted.

In another implementation, the exemplary set of login rules include user identity-specific login rules that are applied after operation 352 or 354 to prohibit or enable a concurrent login by a predetermined user identity regardless of whether a maximum number of concurrent logins in aggregate or for a specific connection type has been reached.

Other implementations are within the scope of the following claims. For example, the functions of the login system 140, the network access server 130, and the online service provider system 150 may be implemented by a single integrated computer system. The wireless access provider system 180 may be affiliated with the online service provider. The connections from the network access server 130, the third party access provider system 170, and the wireless access provider system 180 may be categorized and subdivided in different ways than those discussed previously by, for example, categorizing the connections based on speed of connection (which impacts network bandwidth costs) and additional online service provider overhead costs associated with the connection (similar to modem costs). Connections through the third party access provider system 170 may be subdivided into narrowband, broadband, or private line connections of varying speeds. Each type of connection may be regulated differently by the login system 140.

What is claimed is:

1. A method for regulating network access, the method comprising:
   receiving a request for network access for a user identity;
   identifying a type of connection being sought by the user identity over the network as being among at least one of a dial-up connection, a broadband connection, a wireless connection, and a private line connection;
   identifying the user identity for which the request is submitted;
   identifying one or more other user identities that are associated with the user identity;
   determining whether the other user identities that are identified as being associated with the user identity have network access contemporaneously with the received request;
   determining types of connections used to obtain the network access by the other user identities that are identified as being associated with the user identity and determined to have network access, the types of connections used by the other user identities being among at least one of a dial-up connection, a broadband connection, a wireless connection, and a private line connection; and
   determining whether to grant the user identity the network access requested based on the type of connection being sought by the user identity and based on the types of connections used by the other user identities that are identified as being associated with the user identity and determined to have network access,
   wherein determining whether to grant access comprises applying a set of login rules to determine whether to grant access, and
   wherein applying the set of login rules comprises:
   accessing login rules that indicate a first maximum number of concurrent logins using a first connection type and indicate a second maximum number of concurrent logins using a second connection type, the first connection type being different from the second connection type and the first maximum number being different from the second maximum number;
   determining that the type of connection being sought by the user comprises the first type of connection; and
   denying access conditioned on a number of concurrent logins of the other user identities that are using the first connection type to obtain network access being equal to the first maximum number.

2. The method of claim 1 wherein the user identity is a screen name or an Internet Protocol address and the network access is Internet access.

3. The method of claim 1 wherein the user identity is an e-mail address or a media access control address.

4. The method of claim 1 wherein the type of connection sought by the user identity comprises a broadband connection.

5. The method of claim 4 wherein the broadband connection sought by the user identity comprises a digital subscriber line connection or a cable modem connection.

6. The method of claim 1 wherein the user identity includes an Internet Protocol address and identifying a type of connection includes identifying the type of connection based on the Internet Protocol address.

7. The method of claim 1 wherein the user identity includes a network identity and identifying a type of connection includes identifying the type of connection based on the network identity.

8. The method of claim 1 wherein the other user identities associated with the user identity are other user identities that are associated with the same online service account as the user identity.

9. The method of claim 1, wherein the login rules limit the number of concurrent logins to a maximum number of concurrent logins for a predetermined amount of time.

10. The method of claim 1, wherein the login rules vary based on user identity.

11. The method of claim 1, wherein the login rules limit the number of concurrent logins based on temporal constraints.

12. The method of claim 11, wherein the login rules limit the number of concurrent logins for one or more predetermined time intervals.

13. The method of claim 1, wherein determining whether to grant the user identity access comprises denying access and further comprises sending an access denied message to be perceived by a user associated with the user identity.

14. The method of claim 13, wherein the access denied message is configured to be perceived by the user as a graphical display.

15. The method of claim 13, wherein the access denied message includes information related to the reason why the access was denied.

16. The method of claim 13, wherein the access denied message includes data related to the other user identities.

17. The method of claim 16, wherein the access denied message includes data related to the types of connections used by the other user identities.

18. The method of claim 13, wherein the access denied message includes options configured to be selectable by the user.

19. The method of claim 18, further comprising receiving an option selection from the user and granting limited network access to the user identity associated with the user in response to the received option selection.

20. The method of claim 19, wherein the limited network access comprises network access for a limited duration of time.

21. The method of claim 19, wherein the limited network access comprises network access that is limited to exchanging communications with the other user identities.

22. The method of claim 18, further comprising receiving an option selection from the user and denying network access to one of the other user identities associated with the user identity in response to the received option selection.

23. The method of claim 22, wherein the other user identity that is denied access had access to the network contemporaneously with the received option selection.

24. The method of claim 23, further comprising granting network access to the user identity after denying network access to the other user identity.

25. The method of claim 18, further comprising receiving an option selection from the user and enabling the user to register for a network access service upgrade in response to the received option selection.

26. A computer system for regulating access to an online service provider system, the computer system comprising;
   a customer account data store;
   a system state data store; and
   an authentication server configured to
   receive a request for network access for a user identity,
   identify a type of connection being sought by the user identity over the network as being among at least one of a dial-up connection, a broadband connection, a wireless connection, and a private line connection;
   access the customer account data store to identify one or more other user identities associated with the user identity,
   access the system state data store to determine whether the other user identities have network access contemporaneously with the received request and to determine types of connections used to obtain the network access by the other user identities, the types of connections used by the other user identities being among at least one of a dial-up connection, a broadband connection, a wireless connection, and a private line connection; and
   determine whether to grant the user identity the network access requested based on the type of connection being sought by the user identity and based on the types of connections used by the other user identities that are identified as being associated with the user identity and determined to have network access,
   wherein the authentication server is configured to determine whether to grant the user identity access by applying a set of login rules, and
   wherein the authentication server being configured to apply the set of login rules comprises the authentication server being configured to:
   access login rules that indicate a first maximum number of concurrent logins using a first connection type and indicate a second maximum number of concurrent logins using a second connection type, the first connection type being different from the second connection type and the first maximum number being different from the second maximum number;
   determine that the type of connection being sought by the user comprises the first type of connection; and
   deny access conditioned on a number of concurrent logins of the other user identities that are using the first connection type to obtain network access being equal to the first maximum number.

27. The computer system of claim 26, wherein the customer account data store and the system state data store are a single integrated data store.

28. The computer system of claim 26 wherein the user identity is a screen name or an Internet Protocol address and the network access is Internet access.

29. The computer system of claim 26 wherein the user identity is an e-mail address or a media access control address.

30. The computer system of claim 26 wherein the type of connection sought by the user identity comprises a broadband connection.

31. The computer system of claim 30 wherein the broadband connection sought by the user identity comprises a digital subscriber line connection or a cable modem connection.

32. The computer system of claim 26, wherein the login rules limit the number of concurrent logins to a maximum number of concurrent logins for a predetermined amount of time.

33. The computer system of claim 26, wherein the login rules vary based on user identity.

34. The computer system of claim 26, wherein the login rules limit the number of concurrent logins based on temporal constraints.

35. The computer system of claim 34, wherein the login rules limit the number of concurrent logins for one or more predetermined time intervals.

36. The computer system of claim 26, wherein the authentication server is further configured to deny access and send an access denied message to be perceived by a user associated with the user identity.

37. The computer system of claim 36, wherein the access denied message is configured to be perceived by the user as a graphical display.

38. The computer system of claim 36, wherein the access denied message includes information related to the reason why the access was denied.

39. The computer system of claim 36, wherein the access denied message includes data related to the other user identities.

40. The computer system of claim 39, wherein the access denied message includes data related to the types of connections used by the other user identities.

41. The computer system of claim 37, wherein the access denied message includes options configured to be selectable by the user.

42. The computer system of claim 41, wherein the authentication server is further configured to receive an option selection from the user and grant limited network access to the user identity associated with the user in response to the received option selection.

43. The computer system of claim 42, wherein the limited network access comprises network access for a limited duration of time.

44. The computer system of claim 42, wherein the limited network access comprises network access that is limited to exchanging communications with the other user identities.

45. The computer system of claim 41, wherein the authentication server is further configured to receive an option selection from the user and deny network access to one of the other user identities associated with the user identity in response to the received option selection.

46. The computer system of claim 45, wherein the other user identity that is denied access had access to the network contemporaneously with the received option selection.

47. The computer system of claim 46, wherein the authentication server is further configured to grant network access to the user identity after denying network access to the other user identity.

48. The computer system of claim 41, wherein the authentication server is further configured to receive an option selection from the user and enable the user to register for a network access service upgrade in response to the received option selection.

49. An apparatus for regulating network access, the apparatus comprising:
   means for receiving a request for network access for a user identity;
   means for identifying a type of connection being sought by the user identity over the network as being among at least one of a dial-up connection, a broadband connection, a wireless connection, and a private line connection;

means for identifying the user identity for which the request is submitted;

means for identifying one or more other user identities that are associated with the user identity;

means for determining whether the other user identities that are identified as being associated with the user identity have network access contemporaneously with the received request;

means for determining types of connections used to obtain the network access by the other user identities that are identified as being associated with the user identity and determined to have network access, the types of connections used by the other user identities being among at least one of a dial-up connection, a broadband connection, a wireless connection, and a private line connection; and means for determining whether to grant the user identity the network access requested based on the type of connection being sought by the user identity and based on the types of connections used by the other user identities that are identified as being associated with the user identity and determined to have network access, wherein the means for determining whether to grant access comprises means for applying a set of login rules to determine whether to grant access, and wherein the means for applying the set of login rules comprises:

means for accessing login rules that indicate a first maximum number of concurrent logins using a first connection type and indicate a second maximum number of concurrent logins using a second connection type, the first connection type being different from the second connection type and the first maximum number being different from the second maximum number;

means for determining that the type of connection being sought by the user comprises the first type of connection; and means for denying access conditioned on a number of concurrent logins of the other user identities that are using the first connection type to obtain network access being equal to the first maximum number.

50. The method of claim 8 wherein the other user identities associated with the user identity are other user identities that receive online services with the user as a group and that commonly pay for or are billed for the online services as a group.

51. The method of claim 1, wherein applying the set of login rules further comprises granting access conditioned on the number of concurrent logins of the other user identities using the first connection type to obtain network access being less than the first maximum number.

52. The method of claim 1, wherein applying the set of login rules further comprises:

determining that the number of concurrent logins of the other user identities that are using the first connection type to obtain network access is less than the first maximum number; and granting access conditioned on a number of the other user identities that are using any connection type to obtain network access being less than a third maximum number.

53. The method of claim 1, wherein the first connection type comprises a broadband connection and the second connection type comprises a wireless connection.

54. The computer system of claim 26, wherein the authentication server being configured to apply the set of login rules further comprises the authentication server being configured to grant access conditioned on the number of concurrent logins of the other user identities using the first connection type to obtain network access being less than the first maximum number.

55. The computer system of claim 26, wherein the authentication server being configured to apply the set of login rules further comprises the authentication server being configured to:

determine that the number of concurrent logins of the other user identities that are using the first connection type to obtain network access is less than the first maximum number; and grant access conditioned on a number of the other user identities that are using any connection type to obtain network access being less than a third maximum number.

56. The computer system of claim 26, wherein the first connection type comprises a broadband connection and the second connection type comprises a wireless connection.

* * * * *